(12) United States Patent
Song et al.

(10) Patent No.: US 10,649,173 B2
(45) Date of Patent: May 12, 2020

(54) HEAD MOUNTED DISPLAY AND METHOD FOR CONTROLLING THE SAME

(71) Applicant: LG ELECTRONICS INC., Seoul (KR)

(72) Inventors: Minwoo Song, Seoul (KR); Youngwook Sohn, Seoul (KR); Mansoo Sin, Seoul (KR); Kyungsoo Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 15/617,850

(22) Filed: Jun. 8, 2017

(65) Prior Publication Data

US 2018/0003919 A1  Jan. 4, 2018

(30) Foreign Application Priority Data

Jun. 29, 2016  (KR) .......................... 10-2016-0081842

(51) Int. Cl.
*G02B 7/08* (2006.01)
*G06F 16/583* (2019.01)
(Continued)

(52) U.S. Cl.
CPC ................. *G02B 7/08* (2013.01); *G02B 7/04* (2013.01); *G02B 7/102* (2013.01); *G02B 7/12* (2013.01);
(Continued)

(58) Field of Classification Search
CPC .... G02B 2027/0161; G02B 2027/0163; G02B 2027/0181; G02B 2027/0198;
(Continued)

(56) References Cited

U.S. PATENT DOCUMENTS 10,330,887 B2 *   6/2019   Bristol ..................... G02B 7/12
10,345,602 B2 *   7/2019   Carollo
(Continued)

FOREIGN PATENT DOCUMENTS

| CN | 104932103 | 9/2015 |
| CN | 105549204 | 5/2016 |
| WO | 2006117544 | 11/2006 |

OTHER PUBLICATIONS

European Patent Office Application Serial No. 17178018.2, Search Report dated Nov. 16, 2017, 17 pages.

*Primary Examiner* — Joseph P Martinez
*Assistant Examiner* — Vipin Patel
(74) *Attorney, Agent, or Firm* — Lee Hong Degerman Kang & Waimey

(57) ABSTRACT

Disclosed are a head mounted display (HMD), and a method for controlling the same. The HMD includes: a body having a display unit; a lens driving unit provided at the body, and configured to move a lens unit spaced apart from the display unit, wherein the lens driving unit includes: a lens frame having a first tube portion protruded in a first direction, and coupled to the body; a lens housing having a second tube portion protruded in the first direction and having the lens unit, the second tube portion relatively moved on the first tube portion; a link unit coupled to the lens frame and the lens housing, and configured to move the lens housing; and a driving unit provided at one side of the first tube portion, and configured to operate the link unit.

21 Claims, 10 Drawing Sheets

(51) Int. Cl.
*G02B 27/01* (2006.01)
*G02B 7/12* (2006.01)
*G02B 7/04* (2006.01)
*G02B 7/10* (2006.01)
*G02B 27/02* (2006.01)
*G06K 9/00* (2006.01)
*G02B 27/00* (2006.01)

(52) U.S. Cl.
CPC ....... *G02B 27/017* (2013.01); *G02B 27/0176* (2013.01); *G02B 27/0179* (2013.01); *G02B 27/028* (2013.01); *G06F 16/5838* (2019.01); *G06K 9/0061* (2013.01); *G06K 9/00604* (2013.01); *G06K 9/00617* (2013.01); *G02B 27/0093* (2013.01); *G02B 2027/0161* (2013.01); *G02B 2027/0163* (2013.01); *G02B 2027/0181* (2013.01); *G02B 2027/0198* (2013.01)

(58) Field of Classification Search
CPC .............. G02B 27/0093; G02B 27/017; G02B 27/0176; G02B 27/0179; G02B 27/028; G02B 7/04; G02B 7/08; G02B 7/102; G02B 7/12; G06F 16/5838; G06K 9/00604; G06K 9/0061; G06K 9/00617
See application file for complete search history.

(56) References Cited

U.S. PATENT DOCUMENTS

| | | |
|---|---|---|
| 2004/0008157 A1 | 1/2004 | Brubaker et al. |
| 2006/0072206 A1 | 4/2006 | Tsuyuki et al. |
| 2012/0127062 A1* | 5/2012 | Bar-Zeev ................ G02B 3/14 345/6 |
| 2015/0103152 A1* | 4/2015 | Qin ........................ G02B 13/08 348/53 |

* cited by examiner

HEAD MOUNTED DISPLAY AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0081842, filed on Jun. 29, 2016, the contents of which are incorporated by reference herein in its entirety.

BACKGROUND OF THE INVENTION

1. Field of the Invention

This specification relates to a head mounted display (HMD) capable of automatically controlling a focal point of a lens unit, and a method for controlling the same.

2. Background of the Invention

A head mounted display (HMD) means various types of image display devices mounted on a user's head and configured to allow a user to view images (contents). As a digital device becomes lightweight and small-sized, various wearable computers are being developed, and the HMD is also being widely used. The HMD may provide not only a mere display function, but also various conveniences to a user by being combined with an augmented reality (AR) technique, a virtual reality (VR) technique, an N screen technique, etc.

Recently, as the HMD is being widely used, various functions executable in a mobile terminal are being executed in the HMD. For instance, as specific video information or audio information is provided when a specific function is executed in the mobile terminal, specific video information or audio information may be provided when the specific function is executed in the HMD.

Owing to a characteristic of the HMD that it is worn on a user's head, while the user of the HMD is provided with specific video information or audio information, the user may be effectively disconnected from the rear world. This may allow the user to be provided with various functions with a higher sense of reality.

A lens unit and a display unit of the HMD are spaced apart from each other by a predetermined distance. In this case, the distance should be controlled according to a user's eyesight.

In the conventional art, the distance is controlled as a control lever exposed to the outside is manually rotated. Under such a structure, whenever a user wears the HMD, the user had to control the distance using the control lever. Further, as the control lever is exposed to the outside, appearance of the HMD is degraded.

SUMMARY OF THE INVENTION

Therefore, an aspect of the detailed description is to provide a head mounted display (HMD) capable of automatically controlling a focal point of a lens unit, and a method for controlling the same.

To achieve these and other advantages and in accordance with the purpose of this specification, as embodied and broadly described herein, there is provided a head mounted display, including: a body having a display unit; a lens driving unit provided at the body, and configured to move a lens unit spaced apart from the display unit, wherein the lens driving unit includes: a lens frame having a first tube portion protruded in a first direction, and coupled to the body; a lens housing having a second tube portion protruded in the first direction and having the lens unit, the second tube portion relatively moved on the first tube portion; a link unit coupled to the lens frame and the lens housing, and configured to move the lens housing; and a driving unit provided at one side of the first tube portion, and configured to operate the link unit.

In an embodiment of the present invention, the HMD may further include a plate formed at a lower end of the lens frame and extending from the first tube portion. First and second protrusions may be formed at opposite positions on an outer circumferential surface of the second tube portion. The link unit may include: a first link portion having one end coupled to the plate, and another end coupled to the first protrusion to be moved together with the first protrusion; and a second link portion having one end coupled to the plate, and another end coupled to the second protrusion.

In an embodiment of the present invention, the first and second link portions may be formed to cross each other at a middle region thereof, and may move the lens housing by a reciprocal operation thereof.

In an embodiment of the present invention, the first link portion may include: first and second links formed to enclose an outer circumference of the second tube portion; and a third link configured to connect the first and second links to each other, and having two ends fixed to the plate.

In an embodiment of the present invention, the second link portion may include: a fourth link formed to enclose an outer circumference of the second tube portion, and coupled to the first link at a middle region thereof; and a fifth link coupled to the second link at a middle region thereof.

In an embodiment of the present invention, coupling holes may be formed at middle regions of the first and second links, and protrusions may be formed at middle regions of the fourth and fifth links so as to pass through the coupling holes.

In an embodiment of the present invention, the driving unit may include: a piezo coupled to the first protrusion to restrict a movement of the first protrusion, and moved when a predetermined voltage is applied thereto; a rod formed in a first direction such that the piezo is slidable along the rod; and a frame holder having one end fixed to the plate, and formed in a 'C' shape.

In an embodiment of the present invention, the frame holder may include: first and second parts formed in the first direction; and a third part configured to connect the first and second parts to each other, and provided with a through hole at a middle region thereof, the through hole for passing the rod therethrough.

In an embodiment of the present invention, the HMD may further include: a magnetic member provided at one side of the piezo and moved together with the piezo linear actuator; and a position sensor configured to sense a movement amount of the magnetic member.

In an embodiment of the present invention, the HMD may further include: a light source disposed at a region of the lens unit in an overlapped manner; a reflector configured to reflect a pattern of light emitted from the light source and reflected from a user's eyeballs; and a camera configured to sense the pattern of light reflected from the reflector. An eyesight of the user may be measured based on the pattern sensed by the camera.

In an embodiment of the present invention, the camera may specify the user by recognizing the user's iris.

In an embodiment of the present invention, the lens driving unit may include first and second lens driving portions spaced from each other by a predetermined distance; and a right and left controller provided between the first and second lens driving portions, and configured to move at least one of the first and second lens driving portions in a second direction crossing the first direction.

In an embodiment of the present invention, the right and left controller may include: a piezo moved in the second direction by a voltage applied thereto; a first rod penetratingly-formed at the piezo, extending to the pair of lens driving portions, having one end fixed to the first lens driving portion, and having another end penetratingly-formed at the second lens driving portion; and a second rod having one end fixed to one side of the piezo and another end fixed to the second lens driving portion.

To achieve these and other advantages and in accordance with the purpose of this specification, as embodied and broadly described herein, there is also provided a method for controlling a head mounted display (HMD) including a lens unit and a display unit and capable of controlling a position of the lens unit, the display unit spaced from the lens unit by a predetermined distance and configured to provide video and audio information to a user through the lens unit, the method including: (a) recognizing an iris of a user who has worn the HMD; (b) comparing the recognized iris with an iris stored in a user iris information database, thereby determining whether the user is a pre-registered user; (c) if it is determined that the recognized iris is a pre-registered user's iris, controlling a distance between the lens unit and the display unit into a value pre-stored in a user setting memory.

In an embodiment of the present invention, the method may further include: if it is determined that the recognized iris is not the pre-registered user's iris, measuring an eyesight of the user who has worn the HMD; and controlling a distance between the lens unit and the display unit based on the measured eyesight.

In an embodiment of the present invention, the method may further include: storing the eyesight and the iris of the user who has worn the HMD.

In an embodiment of the present invention, the method may further include: determining whether to micro-control the lens unit after the step of (c); if it is determined to micro-control the lens unit, micro-controlling the lens unit by changing a position of the lens unit; and storing the position of the micro-controlled lens unit.

In an embodiment of the present invention, the micro-control of the lens unit may include a right and left movement of the lens unit for two eyes, and a back and forth movement of the lens unit for two eyes.

In an embodiment of the present invention, the method may further include returning the lens unit to an original position.

In an embodiment of the present invention, in the step of measuring an eyesight of the user who has worn the HMD, beams may be irradiated onto the user's eyes, and then refractivity may be calculated by comparing a pattern of the beams reflected from the user's eyes with a reference pattern such that the eyesight may be calculated based on the refractivity.

The HMD according to an embodiment of the present invention may have the following advantages.

Firstly, a focal point between the lens housing and the lens frame may be automatically controlled.

Secondly, the focal point may be easily controlled through a user input unit after the HMD is worn.

Further, as the lens unit is micro-moved right and left or back and forth, a focal distance suitable for a user may be automatically controlled.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A head mounted display (HMD) 100 of the present description may further include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

Figure 1:
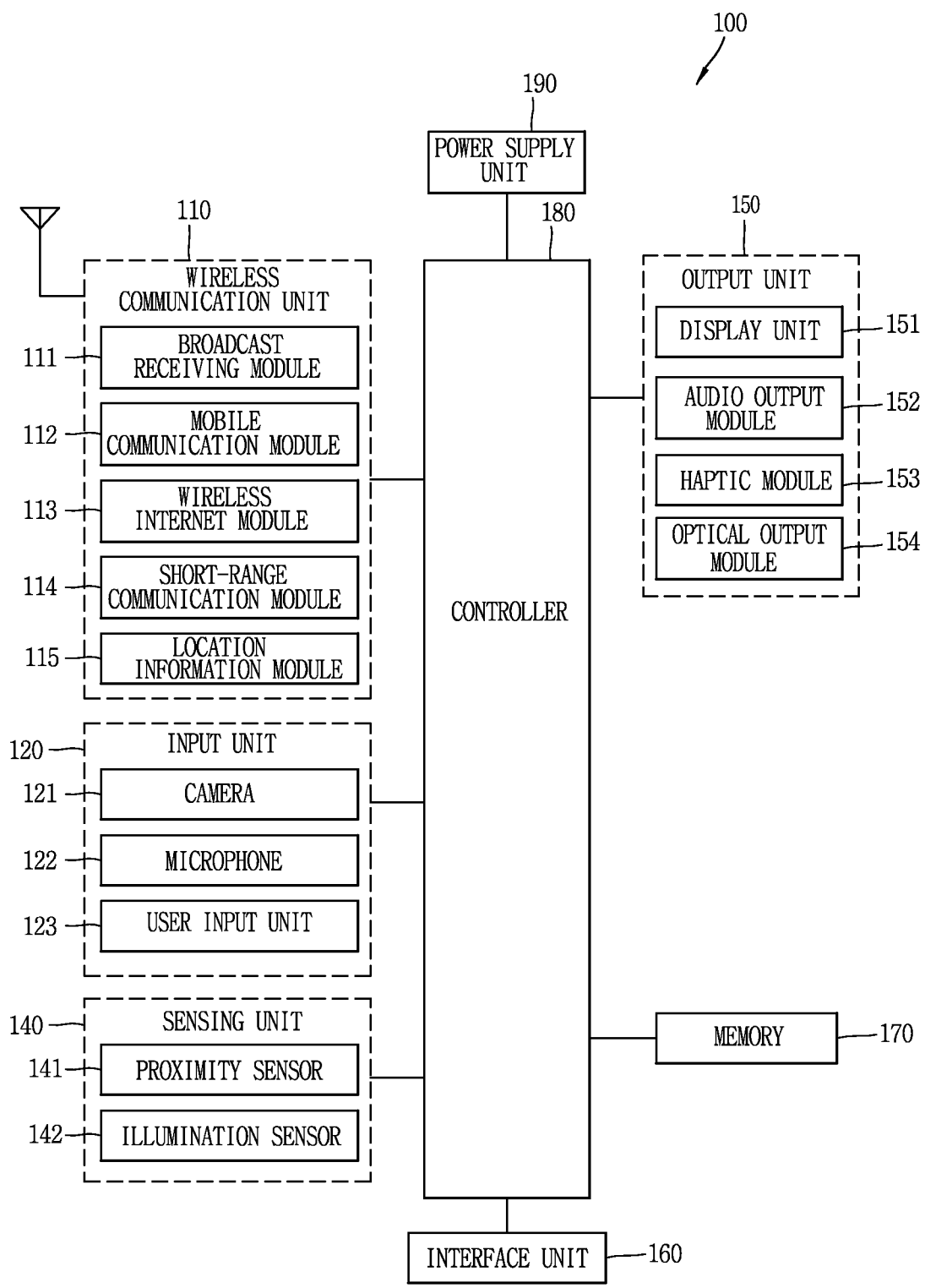
FIG. 1 is a block diagram for explaining a head mounted display (HMD) according to the present invention.

FIG. 1 is a block diagram of an HMD 100 in accordance with one exemplary embodiment.

The HMD 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the HMD 100 having various components, but it is understood that implementing all of the illustrated components is not a requirement. Greater or fewer components may alternatively be implemented.

Hereinafter, each component is described in sequence.

The wireless communication unit 110 typically includes one or more modules which permit communications such as wireless communications between the HMD 100 and a wireless communication system, communications between the HMD 100 and another HMD, communications between the HMD 100 and an external server. Further, the wireless communication unit 110 typically includes one or more modules which connect the HMD 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the HMD, the surrounding environment of the HMD, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The HMD 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The interface unit 160 serves as an interface with various types of external devices that can be coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). It is common for application programs to be stored in the memory 170, installed in the HMD 100, and executed by the controller 180 to perform an operation (or function) for the HMD 100.

The controller 180 typically functions to control overall operation of the HMD 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the HMD. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external HMD, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the HMD 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the HMD 100 and a wireless communication system, communications between the HMD 100 and another HMD 100, or communications between the HMD and a network where another HMD 100 (or an external server) is located, via wireless area networks. One example of the wireless area networks is a wireless personal area networks.

In some embodiments, another HMD (which may be configured similarly to HMD 100) may be a wearable device, for example, a smart watch, a smart glass or a head mounted display (HMD), which is able to exchange data with the HMD 100 (or otherwise cooperate with the HMD 100). The short-range communication module 114 may sense or recognize the wearable device, and permit communication between the wearable device and the HMD 100. In addition, when the sensed wearable device is a device which is authenticated to communicate with the HMD 100, the controller 180, for example, may cause transmission of data processed in the HMD 100 to the wearable device via the short-range communication module 114. Hence, a user of the wearable device may use the data processed in the HMD 100 on the wearable device. For example, when a call is received in the HMD 100, the user may answer the call using the wearable device. Also, when a message is received in the HMD 100, the user can check the received message using the wearable device.

The location information module 115 is generally configured to detect, calculate, derive or otherwise identify a position of the HMD. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the HMD.

As one example, when the HMD uses a GPS module, a position of the HMD may be acquired using a signal sent from a GPS satellite. As another example, when the HMD uses the Wi-Fi module, a position of the HMD can be acquired based on information related to a wireless access point (AP) which transmits or receives a wireless signal to or from the Wi-Fi module.

The input unit 120 may be configured to permit various types of input to the HMD 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the HMD 100. As another example, the cameras 121 may be located in a stereoscopic arrangement to acquire left and right images for implementing a stereoscopic image.

The microphone 122 is generally implemented to permit audio input to the HMD 100. The audio input can be processed in various manners according to a function being executed in the HMD 100. If desired, the microphone 122 may include assorted noise removing algorithms to remove unwanted noise generated in the course of receiving the external audio.

The user input unit 123 is a component that permits input by a user. Such user input may enable the controller 180 to control operation of the HMD 100. The user input unit 123 may include one or more of a mechanical input element (for example, a key, a button located on a front and/or rear surface or a side surface of the HMD 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the HMD at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the HMD, surrounding environment information of the HMD, user information, or the like. The controller 180 generally cooperates with the sending unit 140 to control operation of the HMD 100 or execute data processing, a function or an operation associated with an application program installed in the HMD based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the HMD 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the HMD 100 or a currently executed application program, for example.

The touch sensor and the proximity sensor may be implemented individually, or in combination, to sense various types of touches. Such touches includes a short (or tap)

touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the HMD. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the HMD 100.

An optical output module 154 can output a signal for indicating an event generation using light of a light source. Examples of events generated in the HMD 100 may include message reception, call signal reception, a missed call, an alarm, a schedule notice, an email reception, information reception through an application, and the like.

A signal output by the optical output module 154 may be implemented in such a manner that the HMD emits monochromatic light or light with a plurality of colors. The signal output may be terminated as the HMD senses that a user has checked the generated event, for example.

The interface unit 160 serves as an interface for external devices to be connected with the HMD 100. For example, the interface unit 160 can receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 can serve as a passage to allow power from the cradle to be supplied to the HMD 100 or may serve as a passage to allow various command signals input by the user from the cradle to be transferred to the HMD there through. Various command signals or power input from the cradle may operate as signals for recognizing that the HMD is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

The controller 180 may typically control the general operations of the HMD 100. For example, the controller 180 may set or release a lock state for restricting a user from inputting a control command with respect to applications when a status of the HMD meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the HMD 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
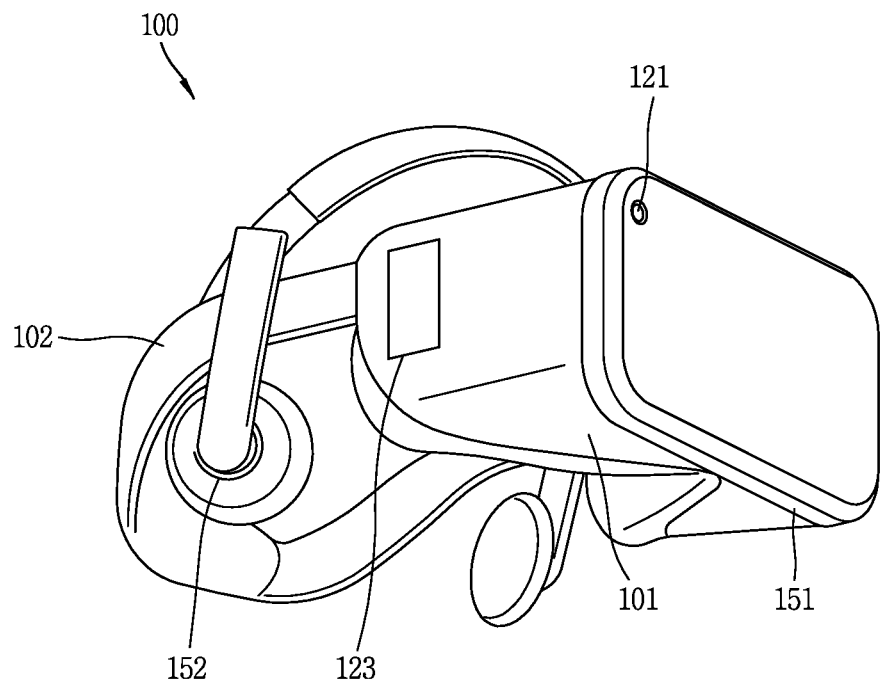
FIGS. 2 and 3 are conceptual views for explaining the HMD according to the present invention.
Figure 3:
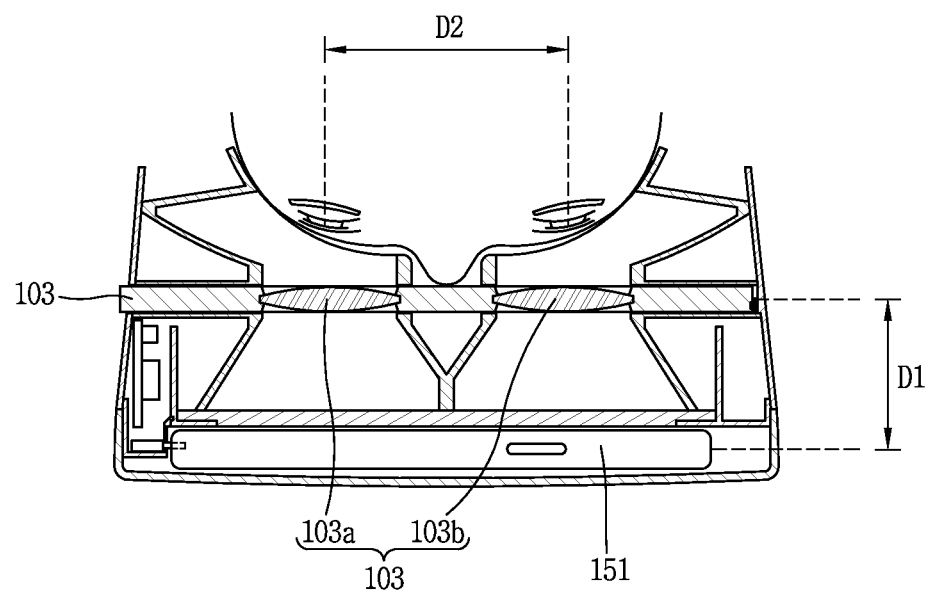

FIGS. 2 and 3 are conceptual views for explaining the HMD according to the present invention.

The HMD 100 of the present invention may include at least one of the components explaining with reference to FIG. 1.

Referring to FIG. 2, the HMD 100 is formed to be wearable on a head (or a face) of a human body, and provided with a frame (case, housing, etc.) therefor.

In the drawings, the HMD 100 includes a frame 101 and a supporting unit 102.

The frame 101 may be called a body (or an HMD body). Here, the HMD body may be understood to indicate the HMD 100 as at least one assembly.

The frame 101 may provide a space where at least one of the components shown in FIG. 1 may be arranged.

More specifically, the frame 101 is supported on the head and defines a space for mounting various components. As illustrated, electronic components, such as the user input unit 123, the camera 121, and the output unit (e.g., the display unit 151 and the controller 180), may be mounted to the frame 101.

The supporting unit 102 may support the frame 101 so as to be mountable on a human's head. The supporting unit 102 may be formed of a flexible material for facilitation of wearing. An electronic component such as the audio output unit 152 may be mounted to the supporting unit 102.

However, the present invention is not limited to this. That is, the components aforementioned in FIG. 1 and components required by the HMD 100 may be variously arranged at the frame 101 and the supporting unit 102. That is, it is understood that implementing all of the illustrated components for the HMD 100 is not a requirement, and that greater or fewer components may alternatively be implemented.

The controller 180 (refer to FIG. 1) is configured to control the various components of the HMD 100. The controller 180 may be understood as a configuration corresponding to the controller 180 of FIG. 1.

The display unit 151 is mounted to the frame, and is configured to output screen information (e.g., images, videos, etc.) in front of a user's eyes. The display unit 151 may be arranged to correspond to at least one of a left eye and a right eye, such that screen information may be displayed in front of a user's eyes when the user wears the HMD 100. In the drawings, the display unit 151 is disposed to cover two eyes (right and left eyes), such that an image is output toward the two eyes.

The display unit 151 may project an image to a user's eyes by using a prism. The prism may be formed of a transmissive material such that the user may see a front view as well as the projected image.

An image output to the display unit 151 may be overlapped with a general view. The HMD 100 may implement an augmented reality (AR) to provide a real image or background overlapped with a virtual image as a single image, by using such a characteristic of the display unit 151.

The display unit 151 of the HMD 100 according to the present invention may be disposed in the body. More specifically, the display unit 151 may be positioned at an inner region of the HMD so as to face a user's eyes when the user wears the HMD on the head.

The camera 121 is disposed close to at least one of right and left eyes, and is configured to capture a front image. Since the camera 121 is arranged near the eyes toward the front side, it may capture a scene at which a user is staring, as an image.

In the drawings, the camera 121 is provided in one. However, the present invention is not limited to this. That is, the camera 121 may be provided in plurality to obtain a stereoscopic image.

The HMD 100 may be provided with the user input unit 123 for inputting a control command. For instance, the user input unit 123 may be mounted to one region of the HMD body as shown in FIG. 2, thereby receiving a control command applied from a user in a tactile manner (e.g., touch or push). That is, in the present invention, the frame is provided with the user input unit 123 to input a control command in push and touch manners.

As another example, the user input unit 123 of the HMD 100 according to an embodiment of the present invention may receive a user's preset gesture, a preset movement of the HMD body, etc. as a control command. For this, the user input unit 123 may include one or more sensors. For instance, the user input unit 123 may include a gyro sensor or an acceleration sensor to sense a movement such as a rotation or an inclined state of the HMD body. The user input unit 123 may further include a camera or an infrared sensor to sense a user's preset eyeline, a preset gesture with respect to the HMD 100.

Once a control command is input through the user input unit 123, the controller 180 may control at least one of the display unit 151 and the audio output unit 152 based on the control command.

The HMD 100 may include a microphone (not shown) which processes input sound into electric audio data, and the audio output module 152 for outputting audio. The audio output module 152 may be configured to produce audio in a general audio output manner or an osteoconductive manner. When the audio output module 152 is implemented in the osteoconductive manner, the audio output module 152 may be closely adhered to the head when the user wears the HMD 100 and vibrate the user's skull to transfer sounds.

The HMD 100 according to an embodiment of the present invention may include one or more microphones (not shown) formed at the HMD body and configured to sense a sound event which occurs from the outside of the HMD 100. The microphone may sense a sound event which occurs from the outside of the HMD 100 and which is not heard by a user, while sound information is output from the audio output unit 152. For instance, the microphone may be a directional microphone configured to detect a position where the sound event has occurred.

Hereinafter, the HMD 100 according to the present invention will be explained with reference to the attached drawings.

The HMD 100 according to an embodiment of the present invention may output images in various manners. For instance, the HMD 100 may output images in a see-through manner. Here, the see-through manner corresponds to a transparent state of the display unit 151 which outputs screen information, and means a method for a user who has worn the HMD 100 to use contents with recognizing a peripheral situation. As another example, the HMD 100 may output images in a front-light manner. Here, the front-light manner means a method to display an image reflected through a reflector such as a mirror, without directly irradiating light onto the eyes.

As another example, the HMD 100 may output images in a see-closed manner. Here, the see-closed manner means a method to use contents through the display unit 151 positioned at a front end of the HMD 100, by which external situations are not viewable through the display unit 151. That is, the see-closed manner is a method to output screen information through the display unit 151.

Hereinafter, the present invention will be explained under an assumption that the HMD 100 outputs images in a see-closed manner. According to the see-closed manner, the display unit 151 may be detachably mounted to the HMD 100, and various media (screen information) such as videos and games may be output from the display unit 151.

Referring to FIG. 3, the HMD 100 according to an embodiment of the present invention may include a lens unit 103 such that a user may view all of screen information output from the display unit 151 formed in the body of the HMD.

That is, the HMD 100 of the present invention may be formed such that all of screen information (or light) output from the display unit 151 may be transmitted to a user's eyes (eyeballs) through the lens unit 103.

For instance, the lens unit 103 may be disposed to correspond to at least one of a user's two eyes (right and left eyes). Alternatively, the lens unit 103 may be disposed between a user's eyeballs and the display unit 151 when the user wears the HMD. The lens unit 103 may be formed by using a concave lens or a convex lens, or through a combination thereof.

Referring to FIG. 3, the HMD 100 according to an embodiment of the present invention may be formed such that a distance (D1) between the lens unit 103 and the display unit 151 may be changed. Hereinafter, this will be explained in more detail with reference to the attached drawings.

The distance (D1) between the lens unit 103 and the display unit 151 may be changed by moving the display unit 151 in a fixed state of the lens unit 103, or by moving the lens unit 103 in a fixed state of the display unit 151, or by moving both of the lens unit 103 and the display unit 151. In an embodiment of the present invention, the lens unit 103 is moved in a fixed state of the display unit 151. However, the present invention is not limited to this.

Figure 4A:
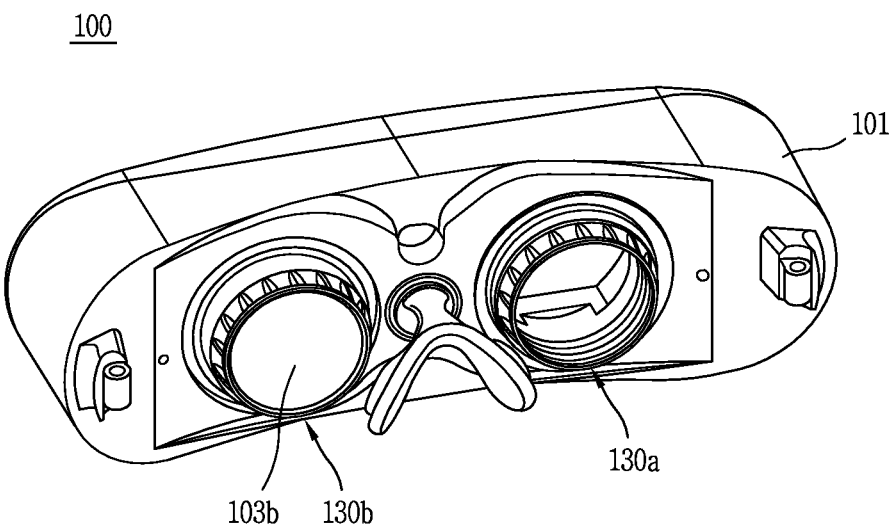
FIG. 4A is a perspective view of the HMD according to an embodiment of the present invention.
Figure 4B:
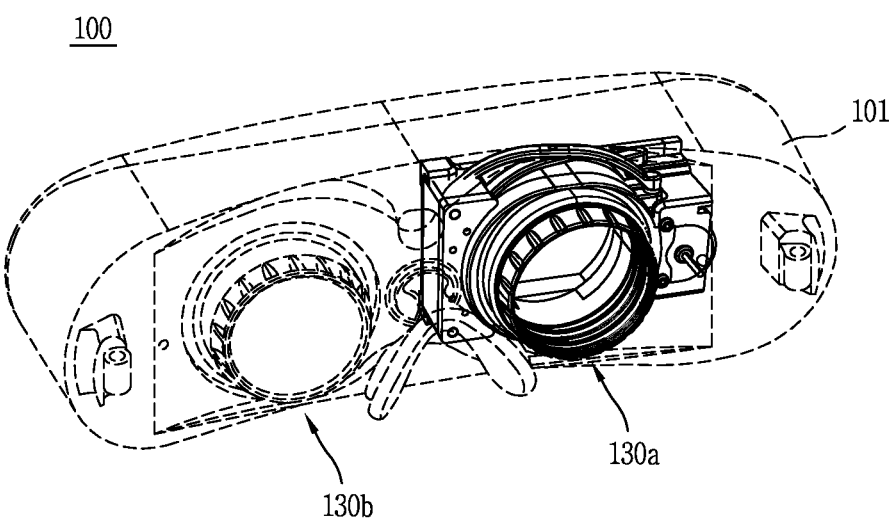
FIG. 4B is a view for explaining a mounting position of a lens driving unit shown in FIG. 4A.

FIG. 4A is a perspective view of the HMD 100 according to an embodiment of the present invention, and FIG. 4B is a view for explaining a mounting position of a lens driving unit 130 shown in FIG. 4A. In FIG. 4B, only the lens driving unit 130 is illustrated in solid lines, and the remaining parts are illustrated in dotted lines.

Figure 5:
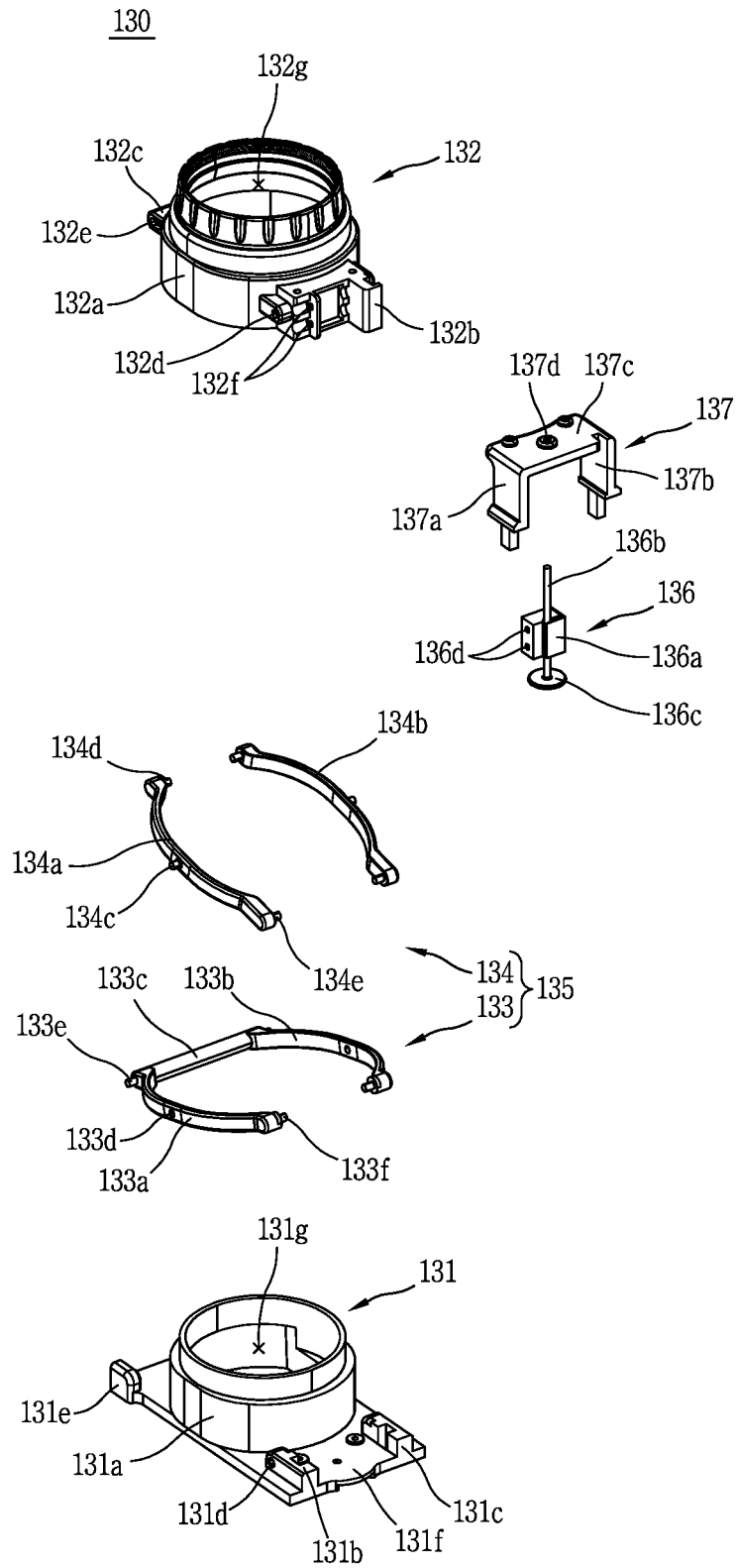
FIG. 5 is an exploded perspective view of the lens driving unit according to an embodiment of the present invention.

FIG. 5 is an exploded perspective view of the lens driving unit 130 according to an embodiment of the present invention.

Hereinafter, the lens driving unit 130 of the present invention will be explained with reference to FIGS. 4A to 5.

The lens driving unit 130 may be applied to all of a lens driving unit 130a provided at a left eye and a lens driving unit 130b provided at a right eye. As shown in FIG. 4A, the lens driving unit 130b is provided with a lens 103b. Referring to FIGS. 3 and 4A, the lens driving unit 130a is provided with a lens 103a, too. However, the lens 103a is not shown in FIG. 4A.

The HMD 100 according to an embodiment of the present invention includes a body 101 having the display unit 151, and the lens driving unit 130 provided at the body 101 and configured to move the lens unit 103 spaced from the display unit 151. In an embodiment of the present invention, the lens driving unit 130 is understood to include the lens unit 103.

The lens driving unit 130 includes a lens frame 131, a lens housing 132, a link unit 135 and a driving unit 136. The lens frame 131 is provided with a first tube portion 131a protruding in a first direction, and is coupled to the body 101. Likewise, the lens housing 132 is provided with a second tube portion 132a protruding in the first direction. The second tube portion 132a is formed to slide on the first tube portion 131a. The lens unit 103 is provided at the lens housing 132. The first tube portion 131a forms an outer circumference of the lens frame 131, and the second tube portion 132a forms an outer circumference of the lens housing 132. The first and second tube portions 131a, 132a are overlapped with each other at one or more sections.

The link unit 135 includes a first link portion 133 and a second link portion 134, and is coupled to the lens frame 131 and the lens housing 132. The link unit 135 is configured to reciprocate the lens housing 132. That is, the first and second tube portions 131a, 132a may be partially overlapped with each other, and a position of the lens unit 103 may be changed according to an overlapped degree therebetween. For this, in this embodiment, an overlapped degree of the second tube portion 132a with the first tube portion 131a may be controlled.

The driving unit 136 is coupled to the second tube portion 132a, and drives the link unit 135. That is, as one side of the driving unit 136 is coupled to the second tube portion 132a, a movement of the driving unit 136 restricts a movement of the second tube portion 132a.

In this case, the lens frame 131 further includes a plate 131f formed at one side of the first tube portion 131a and extending from the first tube portion 131a. That is, a lower part of the lens frame 131 has a shape of a plate 131f, and a first through hole 131g is formed at an inner central part of the lens frame 131 along the first tube portion 131a. The first through hole 131g serves as a passage along which light emitted from the display unit 151 is transferred. Further, the first through hole 131g may serve as a passage along which light reflected from a user's eyeballs moves before the display unit 151 is operated. A second through hole 132g is formed at the lens housing 132 so as to be communicated with the first through hole 131g.

The link unit 135 includes a first link portion 133 and a second link portion 134. Each of the first link portion 133 and the second link portion 134 may be formed to have an approximate 'X' shape when viewed from a side surface. That is, the first link portion 133 and the second link portion 134 may be formed to cross each other at middle regions thereof in a pentagraph shape. In this embodiment of the present invention, as the link unit 135 is formed to have a pentagraph shape, a tilting phenomenon due to the driving unit 136 may be prevented.

More specifically, a first protrusion 132b and a second protrusion 132c are formed at opposite positions on an outer circumferential surface of the lens housing 132, more specifically, the second tube portion 132a. Another end of the first link portion 133 is coupled to the first protrusion 132c, such that the first link portion 133 moves up and down with the first protrusion 132c. And one end of the link portion 133 is coupled to the plate 131f, thereby serving as a rotation center of the first link portion 133. That is, as the driving unit 136 is moved, the first link portion 133 is moved together with the driving unit 136, centering around its region coupled to the plate 131f.

One end of the second link portion 134 is coupled to the plate 131f, and another end of the second link portion 134 is coupled to the second protrusion 132c of the second tube portion 132a. With such a configuration, the second link portion 134 is rotated centering around its region coupled to the plate 131f.

Coupling portions 131b,131c,131e are protruded from the plate 131f, and coupling holes 131d are formed at the coupling portions 131b,131c such that protrusions 134e of fourth and fifth links 134a, 134b are coupled to the coupling holes 131d. Protrusions 133e are formed at two ends of a third link 133c, and are inserted into insertion holes (not shown) of coupling portions 131e such that the third link 133c is coupled to the coupling portion 131e. FIG. 5 illustrates only one coupling portion 131e. However, the coupling portion 131e should be respectively formed at positions corresponding to the coupling portions 131b, 131c.

Each of the first link portion 133 and the second link portion 134 is provided with points 131b, 131c, 131e fixed to the plate 131f, and is rotated about the points 131b,131c, 131e. In this case, each of the first link portion 133 and the second link portion 134 has a very small rotation amount, it seems to linearly move in a first direction. In this case, the points 131b, 131c, 131e of the first link portion 133 are formed to face the points 131b, 131c, 131e of the second link portion 134 on the basis of the first tube portion 131a. The first link portion 133 and the second link portion 134 are formed near an outer circumferential surface of the second tube portion 132a, in a circular or arc shape at least partially.

In an embodiment of the present invention, the first direction means a back and forth direction when a user has worn the HMD 100.

Coupling holes 132d, 132e are formed at the first and second protrusions 132b, 132c, respectively. Protrusions 133f formed at another ends of the first and second links 133a, 133b are coupled to the coupling holes 132d. And protrusions 134 formed at another ends of the fourth and fifth links 134a, 134b are coupled to the coupling holes 132e.

In an embodiment of the present invention, the first and second link portions 133, 134 are coupled to each other at middle regions thereof, and move the lens housing 132 by a reciprocal operation thereof. As the first and second link portions 133, 134 cross each other at middle regions thereof, an unbalanced distribution of power due to the driving unit 136 may be prevented. That is, in an embodiment of the present invention, since the driving unit 136 is coupled to only one side of the first protrusion 132b, an excessive force may be applied to only another end of the first link portion 133. To prevent this, the link unit 135 is formed to have a pentagraph shape.

More specifically, the first link portion 133 is formed to have an approximate 'C' shape. And the first link portion 133 includes first and second links 133a, 133b formed to enclose an outer circumference of the second tube portion 132a, and a third link 133c configured to connect the first and second links 133a, 133b to each other. Each of another ends of the first and second links 133a, 133b is coupled to the first protrusion 132b, and one ends of the first and second links 133a, 133b are connected to two ends of the third link 133c. The first and second links 133a, 133b are coupled to the plate 131f in a connected state to the third link 133c. Each of another ends of the first and second links 133a, 133b is coupled to the third link 133c, and the first and second links 133a, 133b are formed to rotate about the third link 133c.

The second link portion 134 includes a fourth link 134a coupled to the first link 133a at a middle region thereof, and a fifth link 134b coupled to the second link 133b at a middle region thereof. Unlike the first and second links 133a, 133b, the fourth and fifth links 134a, 134b are formed to be separated from each other. Each of one ends of the fourth and fifth links 134a, 134b is coupled to the plate 131f, and each of another ends of the fourth and fifth links 134a, 134b is coupled to an outer circumferential surface of the lens housing 132. The fourth and fifth links 134a, 134b may be formed to have a circular shape or an arc shape at least partially, since they are formed to enclose an outer circumferential surface of the lens housing 132.

More specifically, another ends of the first and second links 133a, 133b are coupled to the first protrusion 132b, and another ends of the fourth and fifth links 134a, 134b are coupled to the second protrusion 132c. And the fourth and fifth links 134a, 134b are fixed to the coupling portions 131b,131c formed on the plate 131f, respectively.

The first link portion 133 is disposed at an outer side than the second link portion 134. However, the present invention is not limited to this. That is, the first link portion 133 may be disposed at an inner side than the second link portion 134.

The first and second link portions 133, 134 are coupled to each other at a crossing point thereof. For this, one of the first and second link portions 133, 134 may be provided with a protrusion, and another of the first and second link portions 133, 134 may be provided with a hole or a groove.

In an embodiment of the present invention, the first and fourth links 133a, 134a are formed to cross each other. A coupling hole 133d is formed at a middle region of the first link 133a, and a protrusion 134c is formed at a middle region of the fourth link 134a so as to pass through the coupling hole 133d of the first link 133a. Likewise, the coupling hole 133d is formed at a middle region of the second link 133b, and the protrusion 134c is formed at a middle region of the fifth link 134b so as to pass through the coupling hole 133d of the fifth link 134b. The coupling hole 133d and the protrusion 134c are merely exemplary for coupling between the first and second link portions 133, 134, and the present invention is not limited to this.

In the conventional art, the lens unit 103 is moved by a user's hand, or the lens unit 103 or the display unit 151 is moved by a motor, etc. However, in case of moving the lens unit 103 by a motor, it is difficult to control a focal point of the lens unit 103 in a micro manner.

In order to solve such a problem, in an embodiment of the present invention, provided is a piezo linear actuator 136a capable of micro-controlling a focal point of the lens unit 103 by using the driving unit 136. In case of using the piezo linear actuator, a micro-control may be executable. For instance, a focal point of the lens unit 103 may be controlled with accuracy of about 2~5 μm.

In an embodiment of the present invention, the driving unit 136 is configured to drive the lens unit 103. The driving unit 136 is coupled to the first protrusion 132b, and is moveable up and down together with the first protrusion 132b. That is, when a predetermined voltage is applied to the piezo linear actuator 136a, the piezo linear actuator 136a is moved upward or downward. In this case, the movement of the piezo linear actuator 136a restricts a movement of the first protrusion 132b. The piezo linear actuator 136a may be called a piezoelectric device.

Figure 6:
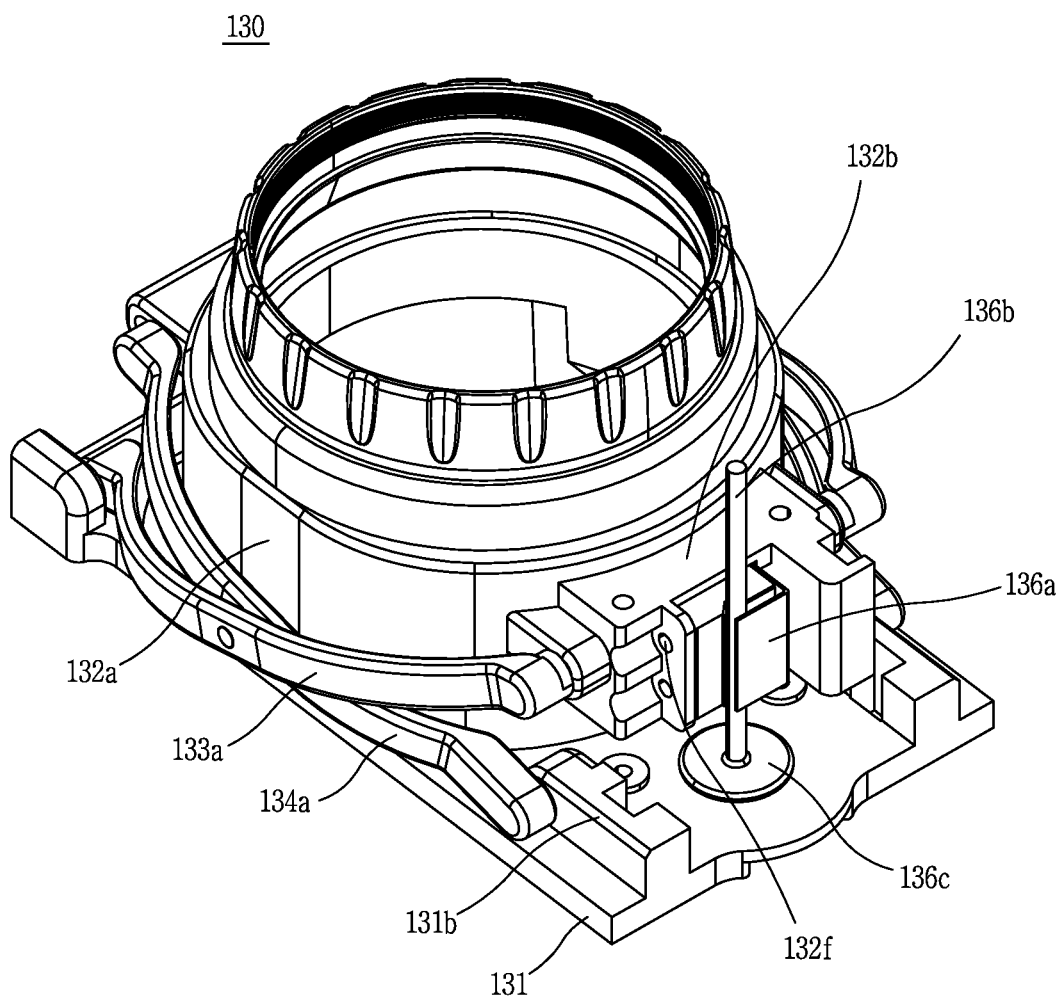
FIG. 6 is a perspective view illustrating a state where a frame holder has been removed from the lens driving unit according to an embodiment of the present invention.

FIG. 6 is a perspective view illustrating a state where a frame holder 137 has been removed from the lens driving unit 130 according to an embodiment of the present invention.

Referring to FIGS. 5 and 6, the piezo linear actuator 136a is provided with a coupling hole 136d, and the first protrusion 132b is also provided with a coupling hole 132f. The piezo linear actuator 136a is fixed to the first protrusion 132b by a coupling member such as a screw (not shown).

More specifically, the driving unit 136 includes the piezo linear actuator 136a, a rod 136b formed in a first direction such that the piezo linear actuator 136a is slidable along the rod 136b, and a frame holder 137 formed at the plate 131f so as to support the rod 136b. The frame holder 137 has an approximate 'C' shape, and two open ends thereof are coupled to the coupling portions 131b,131c, respectively. More specifically, the frame holder 137 includes first and second parts 137a, 137b formed in a first direction and fixed to the coupling portions 131b,131c, respectively, and a third part 137c configured to connect the first and second parts 137a, 137b to each other. The third part 137c is formed in a direction crossing the first direction, and each of the first to third parts 137a,137b,137c is formed to have a predetermined area. The third part 137c is provided with a through hole 137d through which the rod 136b passes.

Once the piezo linear actuator 136a is moved slightly, the first protrusion 132b is also slightly moved and the piezo linear actuator 136a is moved up and down along the rod 136b. A bottom portion 136c is formed at a lower end of the rod 136b, such that the driving unit 136 is stably supported on the plate 131f.

Figure 7A:
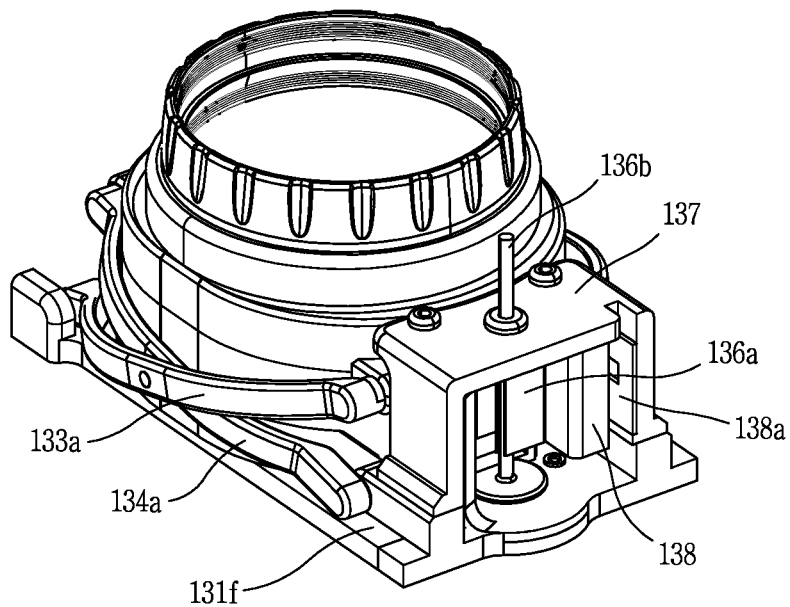
FIGS. 7A and 7B are views for explaining that a lens housing is moved up and down by a driving unit according to an embodiment of the present invention.
Figure 7B:
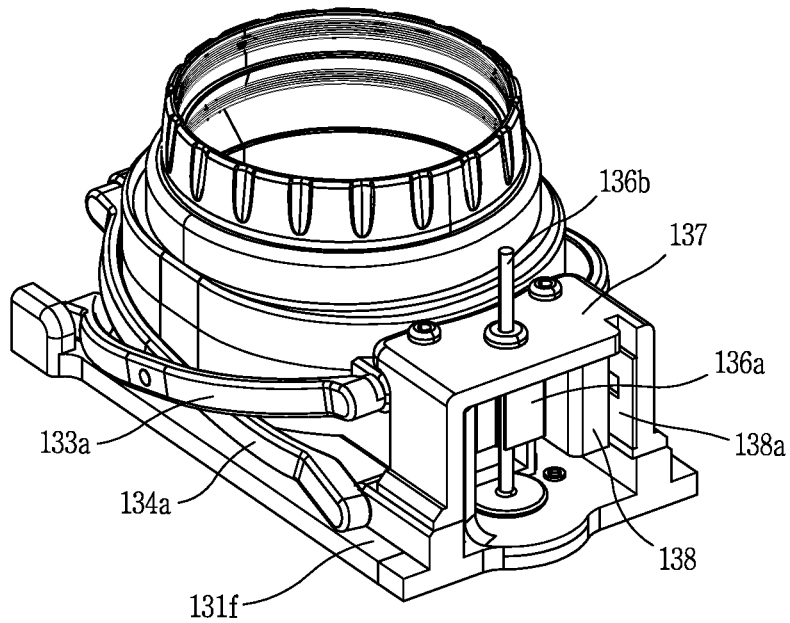

FIGS. 7A and 7B are views for explaining that the lens housing 132 is moved up and down by the driving unit 136 according to an embodiment of the present invention.

FIG. 7A illustrates that the piezo linear actuator 136a is positioned at a relatively lower part, and thereby the lens housing 132 is positioned at a relatively lower part. On the other hand, FIG. 7B illustrates that the piezo linear actuator 136a and the lens housing 132 are positioned at a relatively upper part when compared to those shown in FIG. 7A.

Figure 8A:
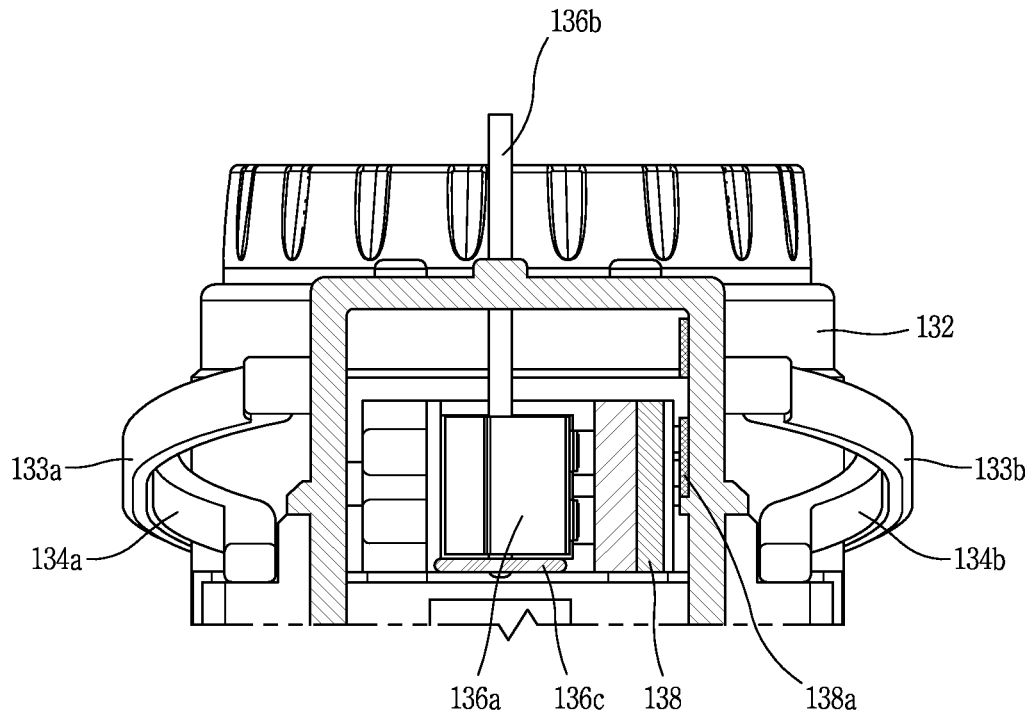
FIGS. 8A and 8B are frontal views illustrating the states of FIGS. 7A and 7B.
Figure 8B:
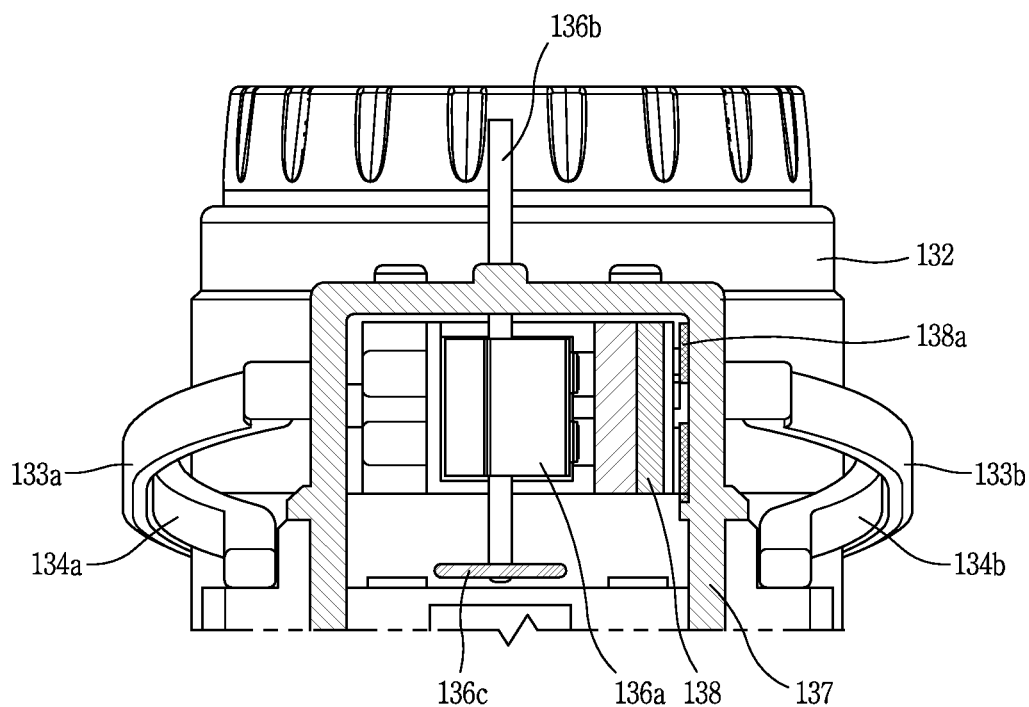

FIGS. 8A and 8B are frontal views illustrating the states of FIGS. 7A and 7B.

Hereinafter, the present invention will be explained in more detail with reference to FIGS. 8A and 8B.

In an embodiment of the present invention, there is provided a configuration to detect a position of the driving unit 136, more specifically, the piezo linear actuator 136a. That is, the HMD 100 according to an embodiment of the present invention further includes a magnetic member 138 provided at one side of the piezo linear actuator 136a and moved together with the piezo linear actuator 136a, and a position sensor 138a configured to sense a movement amount of the magnetic member 138. The magnetic member 138 may be a magnet, and is formed at the first protrusion 132b. Accordingly, the magnetic member 138 is moved together with the first protrusion 132b. The position sensor 138a may sense a position change of the magnetic member 138 by sensing a magnetism change of the magnetic member 138, thereby determining a position of the magnetic member 138. Once a position of the magnetic member 138 is sensed by the position sensor 138a, position information of the magnetic member 138 may be stored such that a proper position may be automatically set according to a user.

In an embodiment of the present invention, since the magnetic member 138 and the position sensor 138a are used, a focal point of the lens unit 103 may be controlled with accuracy of about 2~5 μm. In case of using an optical method such as a photo diode, it is difficult to obtain a resolution of μm. In order to solve such a problem, in this embodiment of the present invention, used is the position sensor for sensing a change of magnetism.

Figure 9:
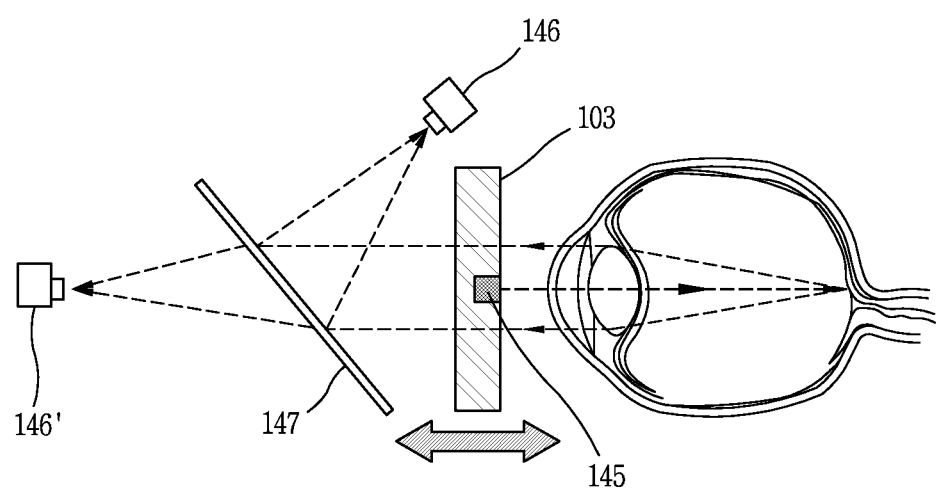
FIG. 9 is a conceptual view for explaining a principle to measure a user's eyesight according to an embodiment of the present invention.

FIG. 9 is a conceptual view for explaining a principle to measure a user's eyesight according to an embodiment of the present invention.

Referring to FIG. 9, in an embodiment of the present invention, when a user wears the HMD 100, the user's eyesight may be automatically measured. For this, the HMD 100 according to an embodiment of the present invention may include a light source 145 disposed at a region of the lens unit 103 in an overlapped manner, a reflector configured to reflect a pattern of light emitted from the light source 145 and reflected from a user's eyeballs, and a camera 146 configured to sense the pattern of light reflected from the reflector 147. The camera 146 configured to capture a user's eyeballs may be the camera 121 of FIG. 2. However, the present invention is not limited to this. That is, an additional camera may be provided in the body 101. A user's eyesight may be measured based on the pattern sensed by the camera 146. The light source 145 may be a light emitting diode (LED), for instance.

Hereinafter, will be explained processes to measure a user's eyesight.

Firstly, beams are irradiated onto a user's eyes by the light source 145 mounted in the HMD 100, and the irradiated beams are reflected from the user's eyeballs to have a predetermined pattern. In this case, the pattern is changed according to an eyesight of the user. Then, the beams reflected from the user's eyes passes through the reflector 147, and an image is in focus on a virtual camera 146' which seems to be positioned on a front surface of the eyes. The reflector 147, a kind of hot mirror, serves to pass beams therethrough only in a single direction. However, an image is in focus on the camera 146 (real camera) by the camera provided in the HMD 100, which is reflected by the reflector 147. And the image is an eye pattern formed by the irradiated beams. Once the user's eye pattern is output, analyzed is a difference between a pre-input ideal eye pattern and the user's eye pattern reflected from the eyes. The pre-input ideal eye pattern is a reference value for measuring a user's eyesight. There is a constant phase difference between the pre-input ideal eye pattern and the real eye pattern. In this case, a phase shift method is applied to obtain a reconstructed eye pattern. Based on the reconstructed eye pattern, refractivity of the eyes is analyzed. And an eyesight of the user is calculated based on the analyzed refractivity. Then, the lens unit 103 is moved according to the calculated eyesight.

In this case, a diopter is used as a unit to represent the refractivity through a focal distance of the lens unit 103. The diopter is a unit to represent refractivity of a lens, and means an inverse number of a focal distance (m). As a focal distance is short, refractivity is high. For instance, when sunlight is focused at a distance of 20 cm (0.2 m) by using a magnifying glass, refractivity of the magnifying glass is 1/0.2=5 (i.e., +5D). A relation between an eyesight and a diopter will be explained in more detail. A degree of nearsightedness, farsightedness and astigmatism may be represented as a diopter. Nearsightedness is represented as (−), and a focal point is controlled by a concave lens. On the other hand, farsightedness is represented as (+), and a focal point is controlled by a convex lens. Nearsightedness of −3D means a state where an image is precisely formed on the retina by using a concave lens of −3D.

The camera 146 may specify a user by recognizing the user's iris. Once the user is specified, information on the user may be stored in the memory 170 of the HMD 100. When the user re-wears the HMD 100, the lens unit 103 may be automatically controlled based on the user's information stored in the memory 170. In this case, the user's information is related to an eyesight.

Figure 10:
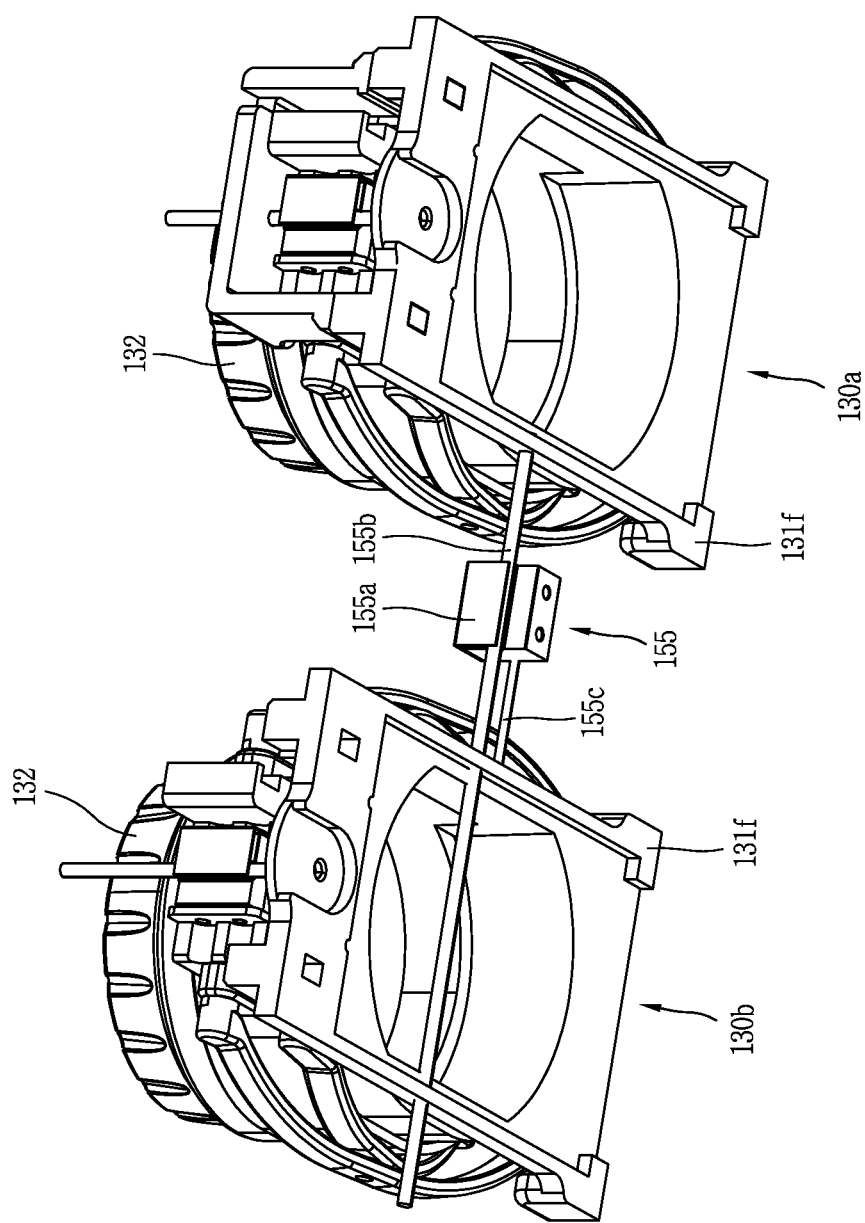
FIG. 10 is a view for explaining a horizontal movement of the lens driving unit according to an embodiment of the present invention.

FIG. 10 is a view for explaining a horizontal movement of the lens driving unit 130 according to an embodiment of the present invention.

As shown in FIG. 3, a distance between pupils (D2) is unique according to each user. A focal distance between the pupils is different according to each user. If the focal distance between the pupils is out of range, a user may have double vision (diplopia) that a single object is seen as two or more objects, due to a difference of images focused on the eyes. If the double vision occurs, eye fatigue may be increased and dizziness may be caused in a severe case. In an embodiment of the present invention, there is provided a method for moving the lens unit 103 and/or the display unit 151 right and left in accordance with a focus of the pupil, in order to prevent double vision.

The double vision (diplopia) means a phenomenon that a single object is seen as two objects due to its shadow. If a single object is seen as two objects when a user views with a single eye, it is called single eye double vision. In this case, the double vision continues even when the user closes the single eye or sees other object. On the other hand, double vision, occurring when the eyes are mis-aligned as part of muscles which control an eye movement is abnormal, is called two-eye double vision. In this case, the two-eye double vision disappears when one eye is closed.

A pair of lens driving portions 130a, 130b, corresponding to two eyes, are spaced apart from each other by a predetermined interval, and at least one of the pair of lens driving portions 130a, 130b is moved in a horizontal direction by a right and left controller 155. The horizontal direction means is a direction crossing the aforementioned first direction, and means a right and left direction. In this case, the lens driving portions 130a, 130b as well as the lens unit 103 are moved.

In an embodiment of the present invention, like the aforementioned driving unit 136, a piezo 155a is used to move at least one of the pair of lens driving portions 130a,130b in a horizontal direction. More specifically, the right and left controller 155 includes a piezo 155a moved by a voltage applied thereto, a first rod 155b penetratingly-formed at the piezo 155a and extending to the pair of lens driving portions 130a,130b, and a second rod 155c having one end fixed to one side of the piezo 155a and another end fixed to one of the pair of lens driving portions 130a,130b.

The first rod 155b serves to guide a movement path of the piezo 155a, and the second rod 155c is moved together with the piezo 155a by being restricted to a movement of the piezo 155a. In FIG. 10, one end of the first rod 155b is fixed to the first lens driving portion 130a of the pair of lens driving portions 130a,130b, and another end of the first rod 155b extends up to the second lens driving portion 130b. Each of the first and second lens driving portions 130a,130b includes the plate 131f, and the first rod 155b extends by passing through the plate 131f of the second lens driving portion 130b.

With such a configuration, the piezo 155a, the second rod 155c and the second lens driving portion 130b may be simultaneously moved, and a distance (D2) between the pair of lens driving portions 130a,130b may be controlled in a micro manner.

In an embodiment of the present invention, the HMD may enter a save mode where the lens driving unit 130 is automatically folded when the HMD 100 is folded. Once the HMD enters the save mode, the lens unit having a controlled focal point returns to the initial position. This may allow a next user to feel as if he or she uses the HMD for the first time due to an initial setting. Further, if the HMD automatically enters the save mode, damage of the lens unit may be reduced, and an entire volume of the HMD 100 may be decreased when the HMD 100 is stored (kept).

Figure 11:
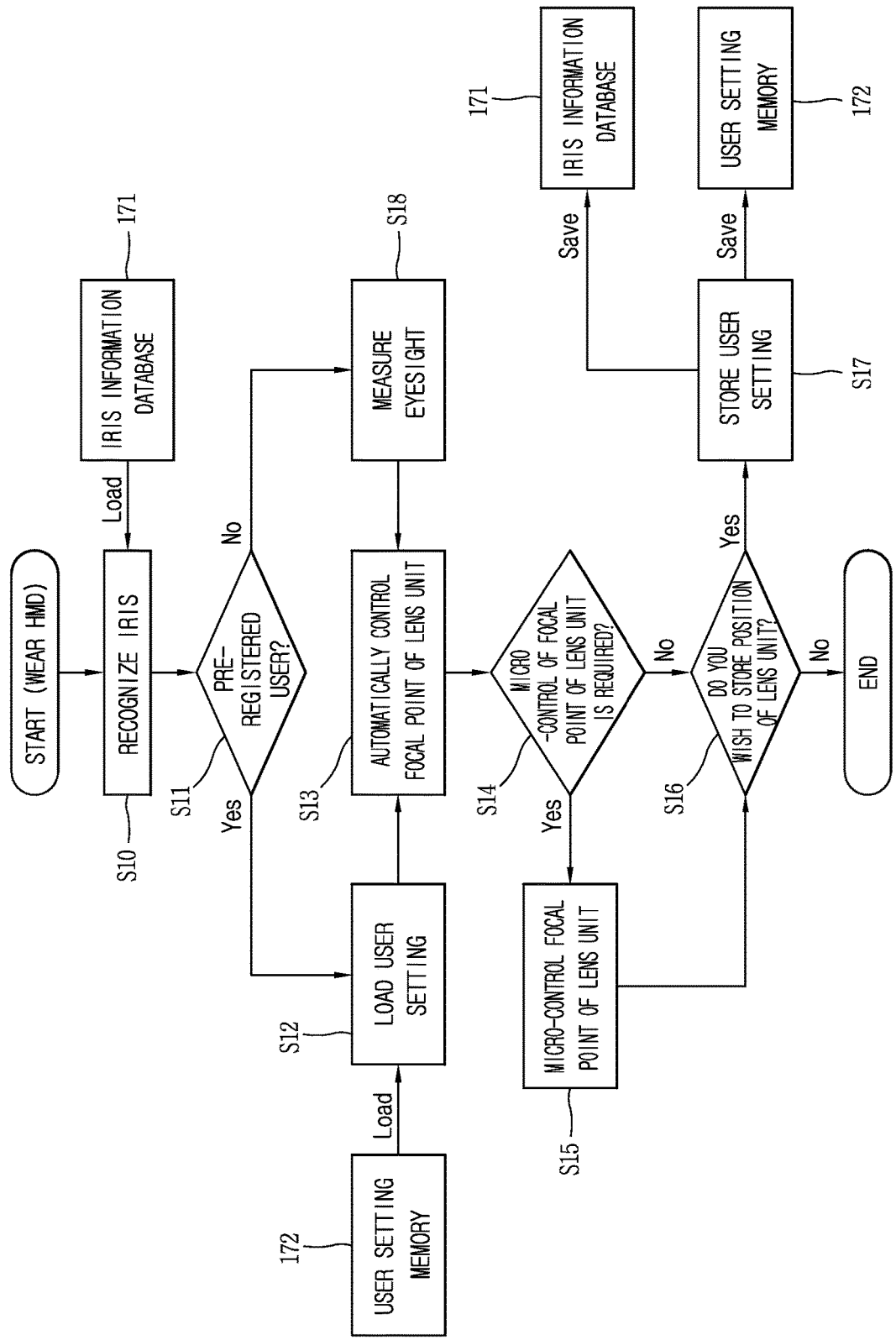
FIG. 11 is a flowchart for explaining a method for controlling an HMD according to an embodiment of the present invention.

FIG. 11 is a flowchart for explaining a method for controlling the HMD 100 according to an embodiment of the present invention.

Hereinafter, a method for controlling the HMD 100 according to an embodiment of the present invention will be explained with reference to FIG. 11.

The method is to control a position of the lens unit 103 in the HMD 100 including the lens unit 103 and the display unit 151, the display unit spaced from the lens unit 103 by a predetermined interval and configured to provide video and audio information to a user.

Firstly, will be explained the method when a pre-registered user wears the HMD 100. Once a user wears the HMD 100, the HMD 100 starts to recognize the user's iris (S10). Then, the HMD 100 determines whether the user is a pre-registered user or not, based on information on the recognized iris (S11). If the user's iris information is the same as pre-registered iris information, the HMD 100 determines that the user is a pre-registered user. Here, the user's iris information is stored in an iris information database 171. The iris information database 171 is a type of memory 170.

Once the user is determined as a pre-registered user, user setting information stored in a user setting memory 172 is loaded (S12). Here, the user setting information includes information on a user's eyesight. That is, a position of the lens unit 103 of the HMD 100 is automatically controlled in accordance with a pre-registered user's eyesight. In this case, the position of the lens unit 103 is controlled right and left or back and forth. In an embodiment of the present invention, information on a previous user who has previously used the HMD 100 may be stored, and the lens unit 103 and the display unit 151 may be automatically controlled right and left or back and forth according to an eyesight and a focal distance of the pupil.

In this case, since the user's eyesight information corresponds to previous information, anisopia may occur when a user who has worn the HMD 100 has an eyesight change, or when the lens unit 103 is out of focus. In this case, it is determined whether to additionally control a focal point of the lens unit 103 (S14). If anisopia occurs, eye fatigue may increase and dizziness may occur. Generally, an eyesight is variable according to each person, and is different in right and left eyes. In order to prevent such anisopia and to obtain a clear view, a position of the lens unit 103 may be controlled right and left or back and forth. The anisopia means that one eye is not focused because a lens for two eyes has been erroneously controlled. In this case, since information received from one unfocused eye is intentionally restricted, an eyesight may be deteriorated.

In case of additionally controlling a position of the lens unit 103, the position of the lens unit 103 may be automatically changed to micro-control a focal point of the lens unit 103 (S16). Once the position of the lens unit 103 is changed, the changed position of the lens unit 103 is stored (S16) and user's setting information is stored together (S17). If an eyesight change occurs, a current eyesight is stored together (S17).

In case of a pre-registered user, a focal point of the lens unit 103 is automatically controlled without a special manipulation. This may allow the user to view play on the display unit 151 immediately after wearing the HMD 100.

However, when a first user wears the HMD 100, pre-registered user's iris information equal to the iris information obtained through the iris recognition step (S10) is not found. Thus, the current user is recognized as the first user. If it is determined that the current user is not a pre-registered user, the current user's eyesight is automatically measured (S18), and a focal point of the lens unit 103 is automatically controlled based on the measured eyesight (S13). Then, it is determined whether to micro-control a focal point of the lens unit 103 in the same manner as the pre-registered user (S14). In case of micro-controlling the lens unit 103 (S15), a position of the lens unit 103 is stored (S16). Here, since the current user is a first user, information on the user's eyesight is stored in the user setting memory 172 (S17), and information on the user's iris is stored in a user iris information memory (S17). As iris information, eyesight information, etc. of a first user are stored, a focal point of the lens unit 103 is automatically controlled when the user re-wears the HMD 100. This may shorten time taken to control a focal point of the lens unit.

Further, since the single HMD 100 may be used by a plurality of users, the lens unit 103 may be controlled to be always disposed at a predetermined position.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A head mounted display (HMD), comprising:
a display;
a body coupled to the display;
a lens driving unit coupled to the body; and
wherein the lens driving unit includes:
a lens frame coupled to the body, wherein the lens frame includes a first tube portion and a plate that is formed at one side of the first tube portion, wherein the first tube portion protrudes from the plate, and wherein the first tube portion includes a central axis;
a lens housing that includes a lens and a second tube portion, wherein the second tube portion includes an inner side that is shaped to overlap varying amounts of an outer side of the first tube portion, the second tube portion and the lens being positionable relative to the first tube portion in first and second directions that are each parallel to the central axis of the first tube portion;
a link unit coupled to the lens frame; and
a driving unit structurally coupled to the lens frame, to the second tube portion, and to the link unit, wherein the driving unit is configured to drive the link unit to cause the second tube portion and the lens to move linearly relative to the first tube portion in the first and second directions and vary an amount of the overlap of the inner side of the second tube portion relative to the outer side of the first tube portion.

2. The HMD of claim 1, further comprising:
first and second protrusions located at opposite positions of an outer circumferential surface of the second tube portion, and wherein the link unit includes:
a first link portion having one end coupled to the plate, and another end coupled to the first protrusion and which is moved together with the first protrusion; and
a second link portion having one end coupled to the plate, and another end coupled to the second protrusion.

3. The HMD of claim 2, wherein the first and second link portions are formed to cross each other at a middle region, and provide a change in relative positioning of the lens housing and the lens frame by reciprocal movement of the first and second link portions.

4. The HMD of claim 3, wherein the first link portion includes:
first and second links formed to enclose an outer circumferential surface of the second tube portion; and
a third link coupling the first and second links and having two ends that are coupled to the plate.

5. The HMD of claim 4, wherein the second link portion includes:
a fourth link formed to formed to enclose the outer circumferential surface of the second tube portion and coupled to the first link at a middle region; and
a fifth link coupled to the second link at a middle region.

6. The HMD of claim 5, further comprising:
coupling holes respectively formed at middle regions of the first and second links; and
protrusions respectively formed at middle regions of the fourth and fifth links and positioned to pass through respective holes of the coupling holes.

7. The HMD of claim 2, wherein the driving unit includes:
a piezo coupled to the first protrusion to restrict a movement of the first protrusion according to voltage being applied to the piezo;
a rod located in a first direction which permits the piezo to be slid along the rod; and
a frame holder having one end fixed to the plate and is formed in a 'C' shape.

8. The HMD of claim 7, wherein the frame holder includes:
first and second parts formed in the first direction;
a third part coupling the first and second parts; and
a hole located at a middle region of the third part that permits the rod to pass therethrough.

9. The HMD of claim 7, further comprising:
a magnetic member provided at one side of the piezo and moved together with the piezo; and
a position sensor configured to sense movement amount of the magnetic member.

10. The HMD of claim 1, further comprising:
a light source positioned to overlap a region of the lens unit;
a reflector configured to reflect a pattern of light emitted from the light source and light reflected from a user's eyes; and
a camera configured to sense the pattern of light reflected from the reflector,
wherein an eye characteristic of the user is measured based on the pattern of light sensed by the camera.

11. The HMD of claim 10, further comprising:
a controller configured to recognize the user based on the measured eye characteristic.

12. The HMD of claim 1, wherein the lens driving unit includes:
first and second lens driving portions spaced from each other by a predetermined distance; and
right and left controllers respectively provided between the first and second lens driving portions, and each configured to move at least one of the first and second lens driving portions in a second direction crossing the first direction.

13. The HMD of claim 12, wherein the right and left controllers include:
a piezo moved in the second direction in response to applied voltage;
a first rod penetratingly-formed at the piezo and extending to the first and second lens driving portions, wherein the first rod includes one end coupled to the first lens driving portion and another end penetratingly-formed at the second lens driving portion; and
a second rod having one end coupled to one side of the piezo and another end coupled to the second lens driving portion.

14. The HMD of claim 1, wherein the second tube portion of the lens housing includes a bottom circumferential portion,
wherein the first tube portion includes a top circumferential portion that is sized to couple with the bottom circumferential portion of the second tube portion,
wherein the second tube portion is linearly positionable relative to the first tube portion, and
wherein the second tube portion includes a central axis that is same as the central axis of the first tube portion.

15. A method for controlling a head mounted display (HMD) including a lens unit and a display and capable of controlling a position of the lens unit, the display spaced from the lens unit by a defined distance and configured to provide information to a user through the lens unit, the method comprising:
recognizing an iris of a user who has worn the HMD;
comparing the recognized iris with iris data stored in a user iris information database;
determining whether the user is a pre-registered user based on the comparing; and
controlling a distance between the lens unit and the display unit according to a value pre-stored in a user setting memory when the determining identifies that the user is the pre-registered user.

16. The method of claim 15, further comprising:
measuring an eye characteristic of the user who has worn the HMD when the determining identifies that the user is not the pre-registered user; and
controlling a distance between the lens unit and the display unit based on the measured eye characteristic.

17. The method of claim 16, further comprising storing the measured eye characteristic.

18. The method of claim 17, wherein the micro-control of the lens unit includes a right and left movement of the lens unit for two eyes, and a back and forth movement of the lens unit for two eyes.

19. The method of claim 16, wherein the measuring an eye characteristic of the user includes directing light beams and calculating refractivity by comparing a pattern of the beams reflected from the user's eyes with a reference pattern and calculating the eye characteristic based on the refractivity.

20. The method of claim 15, further comprising:
determining whether to micro-control the lens unit after the determining whether the user is a pre-registered user;
micro-controlling the lens unit by changing a position of the lens unit when it is determined to micro-control the lens unit; and
storing the position of the micro-controlled lens unit.

21. The method of claim 15, further comprising returning the lens unit to an original position.

* * * * *